United States Patent
Fukai

(10) Patent No.: US 10,168,589 B2
(45) Date of Patent: Jan. 1, 2019

(54) DISPLAY APPARATUS

(71) Applicant: SAKAI DISPLAY PRODUCTS CORPORATION, Sakai-shi, Osaka (JP)

(72) Inventor: Hiroki Fukai, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/880,247

(22) Filed: Jan. 25, 2018

(65) Prior Publication Data

US 2018/0164621 A1    Jun. 14, 2018

Related U.S. Application Data

(63) Continuation of application No. PCT/JP2015/071545, filed on Jul. 29, 2015.

(51) Int. Cl.
| | |
|---|---|
| *H05K 1/02* | (2006.01) |
| *G02F 1/1345* | (2006.01) |
| *G02F 1/1333* | (2006.01) |
| *G09F 9/00* | (2006.01) |

(52) U.S. Cl.
CPC .......... *G02F 1/1345* (2013.01); *G02F 1/1333* (2013.01); *G09F 9/00* (2013.01)

(58) Field of Classification Search
CPC .. Y10S 345/905; H05K 1/0277; H05K 1/028; H05K 1/0283; H05K 1/0281; H01L 23/4985; G02F 1/1345; G02F 1/1333; G09F 9/00
USPC ................... 361/152, 749, 679.01, 727, 809; 345/204, 205; 174/254, 135, 255
See application file for complete search history.

(56) References Cited

U.S. PATENT DOCUMENTS

| | | | |
|---|---|---|---|
| 6,972,963 B1* | 12/2005 | Chou .................. | H01L 23/4985 174/252 |
| 2010/0142151 A1* | 6/2010 | Bang .................. | H05K 7/20963 361/707 |
| 2014/0078692 A1* | 3/2014 | Park ........................ | H05K 7/02 361/749 |

FOREIGN PATENT DOCUMENTS

| | | |
|---|---|---|
| JP | 62-123688 | 8/1987 |
| JP | 2001-331122 A | 11/2001 |
| JP | 2006-171299 A | 6/2006 |

(Continued)

OTHER PUBLICATIONS

ISR issued in Int'l. App. No. PCT/JP2015/071545, dated Aug. 25, 2015.

*Primary Examiner* — Steven T Sawyer
(74) *Attorney, Agent, or Firm* — Greer Burns & Crain Ltd.

(57) ABSTRACT

A display apparatus including: a display panel; a circuit board outputting an image signal associated with an image for display on the display panel; a flexible printed circuit board connecting the display panel and the circuit board, the flexible printed circuit board having first and second surfaces, wiring lines and a driving circuit, the wiring lines electrically connecting the display panel and the circuit board, and the driving circuit driving the display panel based on the image signal; and a cover overlapping a portion of the second surface of the flexible printed circuit board, the portion corresponding in location at least to the driving circuit and a periphery around the driving circuit, the cover engages the flexible printed circuit board so as to be capable of sliding along two opposing edges of the flexible printed circuit board that are connected to neither the display panel nor the circuit board.

5 Claims, 7 Drawing Sheets

(56) References Cited

FOREIGN PATENT DOCUMENTS

| | | |
|---|---|---|
| JP | 2008-47560 A | 2/2008 |
| JP | 2008-151990 A | 7/2008 |
| JP | 2010-102219 A | 5/2010 |

* cited by examiner

DISPLAY APPARATUS

This is a continuation of International Application No. PCT/JP2015/071545, with an international filing date of Jul. 29, 2015, the entire contents of which are hereby incorporated by reference.

BACKGROUND OF THE INVENTION

1. Field of the Invention

The present invention relates to a display apparatus in which a display panel and a circuit board are connected by flexible wiring substrates.

2. Description of the Related Art

The background will be described with respect to a liquid crystal display apparatus as an example. Liquid crystal display apparatuses are generally used for computer displays, television receivers, information displays on which to present a wide variety of information, and so forth. For example, a liquid crystal display apparatus of the active matrix type is structured so as to control the light transmittance at each pixel by causing a thin film transistor (TFT), which is provided for each pixel, to function as a switching element, such that a signal voltage (gray scale voltage) is applied to a pixel electrode during a period when the switching element is on, thus avoiding crosstalk between pixels as well as allowing for high-definition, multi-grayscale displaying.

In general, a liquid crystal display panel in a liquid crystal display apparatus has two light-transmissive substrates, which are made of thin glass plates, and a liquid crystal layer sealed between these substrates. On one of the substrates (the TFT-side glass substrate), a pixel electrode, a TFT, and the like are formed for each pixel. On the other substrate (the CF-side glass substrate), color filters, which are opposed to the pixel electrodes, and a common electrode (counter electrode) that is shared among all pixels are formed.

On the TFT-side glass substrate, a plurality of gate lines extending along the horizontal direction and a plurality of source lines extending along the vertical direction are formed. Each of the rectangular regions defined by these gate and source lines may correspond to a pixel region. In each pixel region, a TFT, which is a switching element, and a pixel electrode are formed.

Moreover, a liquid crystal display apparatus includes a printed circuit board with which to drive the liquid crystal layer by suppling voltages to the gate lines and the source lines that are formed on the TFT-side glass substrate. Electrical connection between this printed circuit board and the interconnections on the TFT-side glass substrate is achieved by, for example, flexible printed circuit boards having flexible films, e.g., polyimide films (see, for example, Japanese Laid-Open Patent Publication No. 2001-331122).

On one surface of each flexible printed circuit board, wiring lines for providing electrical connection between the aforementioned printed circuit board and interconnections on the TFT-side glass substrate, and a driver IC to drive display elements of the liquid crystal display panel are provided. Among these kinds of flexible printed circuit boards, those whose driver IC is mounted by the COF (Chip On Film) method are generally used, because they obviate the need for providing a device hole through which to mount a driver IC and further because their wiring lines can be easily designed with a narrow pitch.

SUMMARY OF THE INVENTION

In a display apparatus in which a display panel and a printed circuit board are connected by flexible printed circuit boards, when a flexible printed circuit board suffers bending stresses, stress concentration will occur at the boundary with the driver IC thereof, thereby damaging the wiring lines on the flexible printed circuit board. For example, as they become applied to curved screen displays in the recent developments, there have been demands for applications where the flexible printed circuit boards are bent or straightened relative to the curved surfaces of the curved screen, raising an issue of the occurrences of broken wiring lines of the flexible printed circuit boards.

The present invention has been made in view of these circumstances, and an objective thereof is to provide a display apparatus that avoids stress concentration on flexible printed circuit boards and thus reduces damage to wiring lines on the flexible printed circuit boards.

A display apparatus according to an embodiment of the present application comprises: a display panel; a circuit board which outputs an image signal associated with an image to be displayed on the display panel; a flexible printed circuit board which connects the display panel and the circuit board, the flexible printed circuit board having a first surface and a second surface opposite to the first surface, wiring lines and a driving circuit being provided on the first surface, the wiring lines providing electrical connection between the display panel and the circuit board, and the driving circuit driving the display panel based on the image signal which is output from the circuit board; and a cover overlapping a portion of the second surface of the flexible printed circuit board, the portion corresponding in location at least to the driving circuit and a periphery around the driving circuit on the first surface, the cover being engaged with the flexible printed circuit board so as to be capable of sliding along two opposing edges of the flexible printed circuit board that are connected to neither the display panel nor the circuit board.

In one embodiment, the cover comprises: a plate member disposed over the second surface of the flexible printed circuit board, the plate member having a width which is larger than a distance separating the two opposing edges of the flexible printed circuit board; and two fold-back flaps continuing from the plate member, the two fold-back flaps being respectively folded back from two opposing edges along the width direction of the plate member toward the first surface of the flexible printed circuit board.

In one embodiment, the cover comprises: a plate member disposed over the second surface of the flexible printed circuit board, the plate member having a width which is larger than a distance separating the two opposing edges of the flexible printed circuit board; and two lift-up flaps disposed on the first surface of the flexible printed circuit board so as to respectively catch the two opposing edges of the flexible printed circuit board in between the plate member and themselves.

In one embodiment, the plate member and the two lift-up flaps comprise an integral piece.

In one embodiment, the cover is a tubular body overlapping both the first surface and the second surface of the flexible printed circuit board.

According to one embodiment of the present invention, flexible printed circuit boards can be connected to a liquid crystal panel and a circuit board, without ruining their inherent flexibility. Moreover, one embodiment of the present invention also allows stress concentration around driving circuits to be reduced, thereby preventing destruction of the flexible printed circuit boards.

DETAILED DESCRIPTION OF PREFERRED EMBODIMENTS

Hereinafter, the present invention will be specifically described with respect to a liquid crystal display apparatus as an example, based on drawings illustrating embodiments thereof.

Embodiment 1

Figure 1:
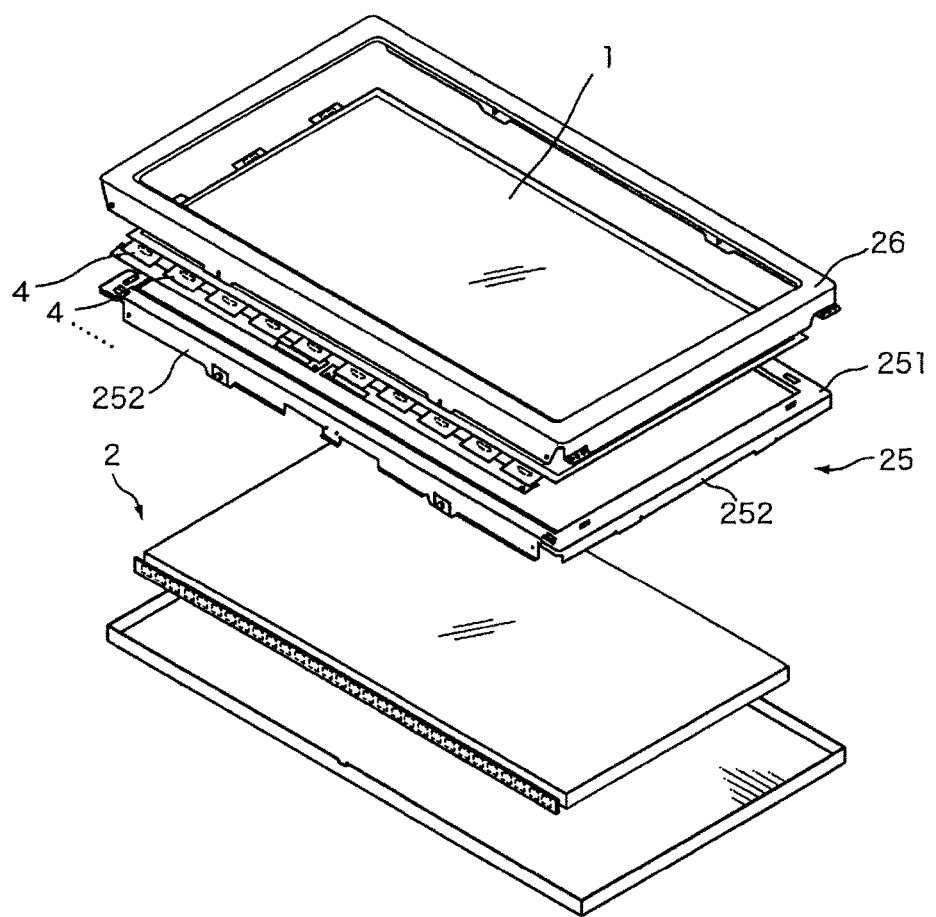
FIG. 1 is an exploded perspective view of a display apparatus according to Embodiment 1.
Figure 2:
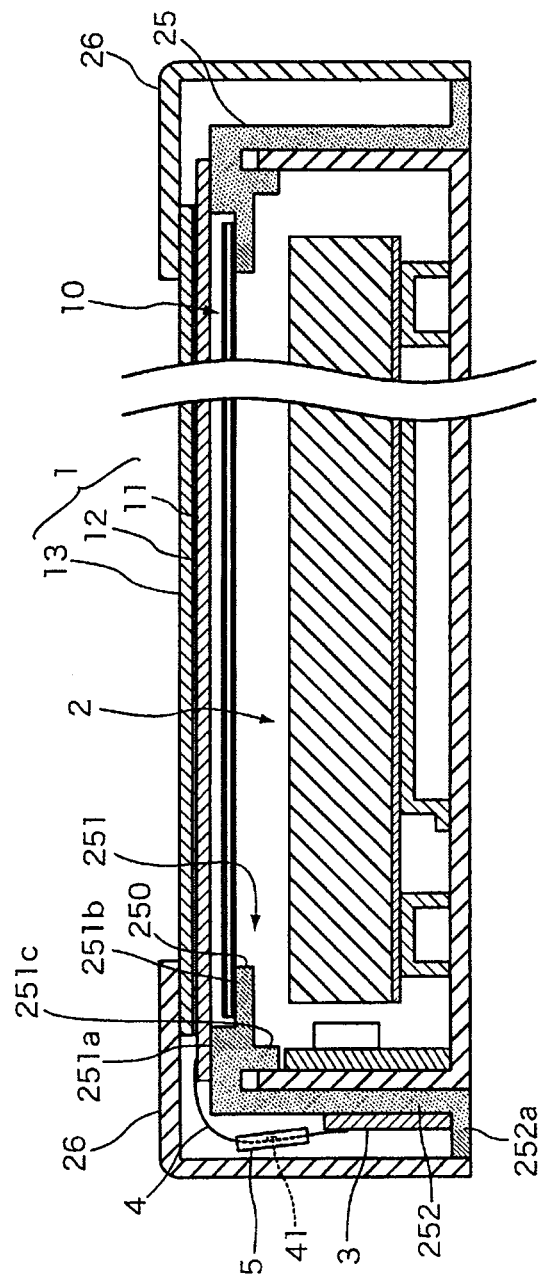
FIG. 2 is a longitudinal cross-sectional view of the display apparatus according to Embodiment 1.

FIG. 1 is an exploded perspective view of a display apparatus according to Embodiment 1, and FIG. 2 is a longitudinal cross-sectional view of the display apparatus according to Embodiment 1. The display apparatus according to the present embodiment is a liquid crystal display apparatus including a rectangular, plate-like liquid crystal panel 1 and an edgelight-type light source device 2 disposed at the rear side of the liquid crystal panel 1.

The liquid crystal panel 1 is, for example, a rectangular-shaped display panel comprising a TFT-side glass substrate 11 (TFT: Thin-Film transistor), a liquid crystal layer 12, and a CF-side glass substrate 13 (CF: Color Filter).

The TFT-side glass substrate 11 is a light-transmissive, rectangular-shaped substrate having a slightly larger area than does the CF-side glass substrate 13. On one surface of the TFT-side glass substrate 11, liquid crystal display elements, which respectively correspond to a plurality of displaying pixels that are arranged in a matrix form, and signal lines (source lines and gate lines) to supply signals for driving the liquid crystal display elements are formed. Also, a plurality of flexible printed circuit boards 4 are connected to the periphery around the TFT-side glass substrate 11 at certain intervals, such that the plurality of flexible printed circuit boards 4 supply image signals and the like to the signal lines.

Each flexible printed circuit board 4 has an IC chip 41 mounted thereon, the IC chip including a driving circuit (a source driver or a gate driver) for driving one or more of the liquid crystal display elements. To each flexible printed circuit board 4 on which an IC chip 41 with a source driver is mounted, an image signal and an image-signal voltage based on the image signal are input from a circuit board 3, which will be described later. The IC chip 41 provided with the source driver applies image-signal voltages to one or more of the source lines on the TFT-side glass substrate 11, based on the image signals and the image-signal voltages which are input thereto.

On the other hand, to each flexible printed circuit board 4 on which an IC chip 41 with a gate driver is mounted, a scanning signal is input from the circuit board 3 in order to select a liquid crystal display element to which an image signal is to be supplied. The IC chip 41 provided with the gate driver applies scanning-signal voltages to one or more of the gate lines on the TFT-side glass substrate 11, based on the scanning signals which are input thereto.

The CF-side glass substrate 13 is a light-transmissive, rectangular-shaped substrate which is disposed with one surface opposing a surface of the TFT-side glass substrate 11. On the opposing surface of the CF-side glass substrate 13, a counter electrode, a black matrix which partitions the displaying region into a grating pattern corresponding to the displaying pixels, and the like (not shown) are provided.

The TFT-side glass substrate 11 and the CF-side glass substrate 13 are attached together with a sealing member, such that there is an interspace between both substrates. Within the interspace between the TFT-side glass substrate 11 and the CF-side glass substrate 13, a liquid crystal material is sealed to form a liquid crystal layer 12.

A panel chassis 25 includes: a shield 251 having an aperture 250; and four side walls 252 that continue perpendicularly from the periphery of the shield 251. On the front side of the shield 251, along the periphery of the aperture 250, a panel supporter 251a to support the liquid crystal panel 1 and a sheet supporter 251b to support a group of optical sheets 10 are provided. On the rear side of the panel supporter 251a, an inner periphery wall 251c is provided so as to protrude toward the rear side. Moreover, along the periphery of an aperture on the rear side, the panel chassis 25 includes protrusions 252a that protrude outward from the side walls 252.

On the panel supporter 251a and the sheet supporter 251b of the panel chassis 25, the liquid crystal panel 1 and the group of optical sheets 10 are mounted, respectively. In a state where the liquid crystal panel 1 and the group of optical sheets 10 have respectively been mounted on the panel supporter 251a and the sheet supporter 251b, a bezel 26 is attached to the light source device 2.

The bezel 26 is a frame body, shaped like a picture frame, that is slightly larger than panel chassis 25. From the front side of the display apparatus, the bezel 26 covers the periphery of the liquid crystal panel having been mounted over the light source device 2 (i.e., on the panel supporter 251a of the panel chassis 25). When the bezel 26 is attached to the light source device 2, the inner peripheral surface of the bezel 26 abuts along the front-side aperture onto the periphery of the liquid crystal panel 1, while it abuts along the rear-side aperture onto the protrusions 252a of the panel chassis 25. Thus, the liquid crystal panel 1 becomes supported between the front-side inner peripheral surface of the bezel 26 and the panel supporter 251a of the panel chassis 25.

In a space formed between the inner peripheral surface of the bezel 26 and the outer peripheral surface of the panel chassis 25, a circuit board 3 is provided to supply image signals and signal voltages to the display elements of the liquid crystal panel 1. The circuit board 3 and the liquid crystal panel 1 are electrically connected by the flexible printed circuit boards 4.

Each flexible printed circuit board 4 may be a flexible film base member 40 having an IC chip 41 mounted on one surface thereof by the COF method, for example, made of such as polyimide, etc. On the one surface of the film base member 40, wiring lines 42a through which to connect the IC chip 41 to the circuit board 3 and wiring lines 42b through which to connect the IC chip 41 to the liquid crystal panel 1 (i.e., to one or more of the signal lines on the TFT-side glass substrate 11) are formed (refer to FIG. 6).

The one surface of the flexible printed circuit board 4, on which the wiring lines 42a and 42b, and the IC chip 41 are provided, may also be referred to as the "first surface". The other surface opposite to the one (i.e., first) surface may also be referred to as the "second surface".

Each flexible printed circuit board 4 is connected to the liquid crystal panel 1 and the circuit board 3 in such a manner that, for example, the one surface having the IC chip 41 mounted thereon (i.e., the first surface of the flexible printed circuit board 4) is opposed to the outer peripheral surface of the panel chassis 25.

Figure 3:
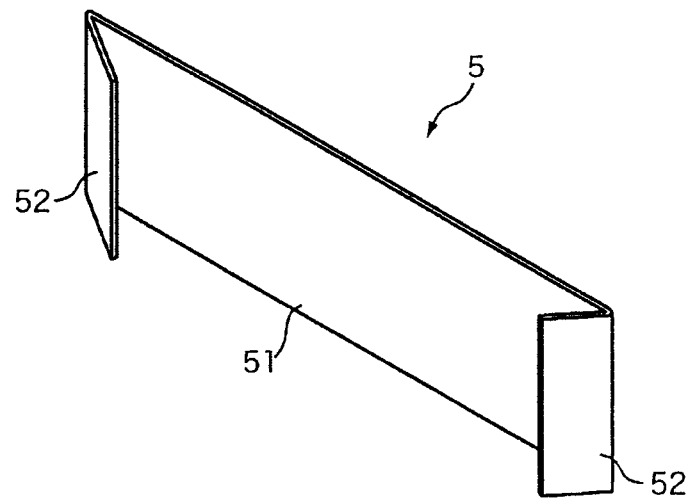
FIG. 3 is a schematic perspective view of a cover according to Embodiment 1.
Figure 4:
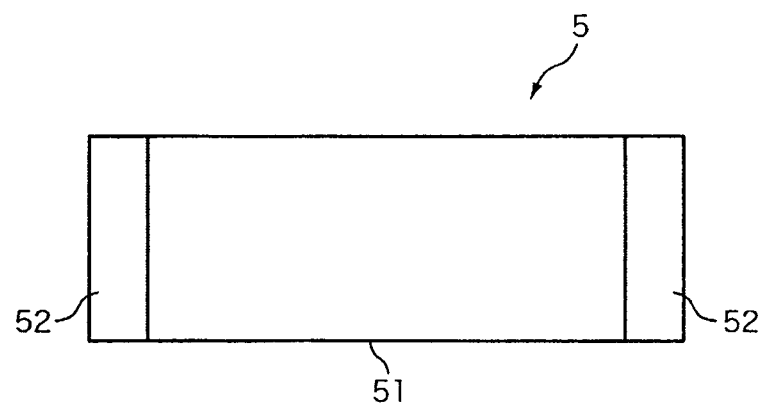
FIG. 4 is a front view of the cover according to Embodiment 1.
Figure 5:
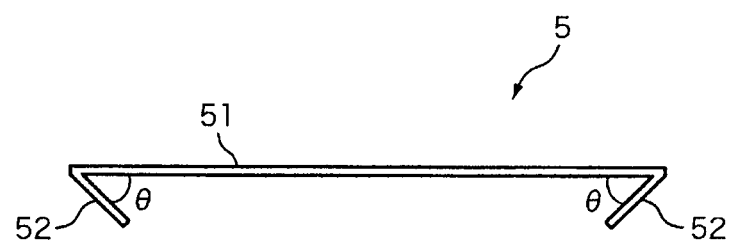
FIG. 5 is an upper plan view of the cover according to Embodiment 1.

Moreover, in the present embodiment, a cover 5 is provided so as to overlap a portion of the other surface (i.e., the second surface) of each flexible printed circuit board 4. This portion corresponds in location at least to the IC chip 41 and a periphery around the IC chip 41 on the first surface of the flexible printed circuit hoard 4. FIG. 3 is a schematic perspective view of the cover 5 according to Embodiment 1; FIG. 4 is a front view of the cover 5 according to Embodiment 1; and FIG. 5 is an upper plan view of the cover 5 according to Embodiment 1. The cover 5 according to Embodiment 1 includes a rectangular-shaped plate member 51, which has a slightly larger width than does the flexible printed circuit board 4, and two fold-back flaps 52 that are folded back in the same direction from the two opposing edges along the width direction of the plate member 51. The plate member 51 and the two fold-back flaps 52 of the cover 5 are an integral piece formed out of a relatively light-weight, thin plate member made of a plastic, etc.

The angle θ between the plate member 51 and each fold-back flap 52 of the cover 5 is an angle which is smaller than 90 degrees, or more preferably, an angle which is smaller than 45 degrees. The cover 5 is mounted so as to engage with the flexible printed circuit board 4 by catching the flexible printed circuit board 4 in between the plate member 51 and the two fold-back flaps 52.

Figure 6:
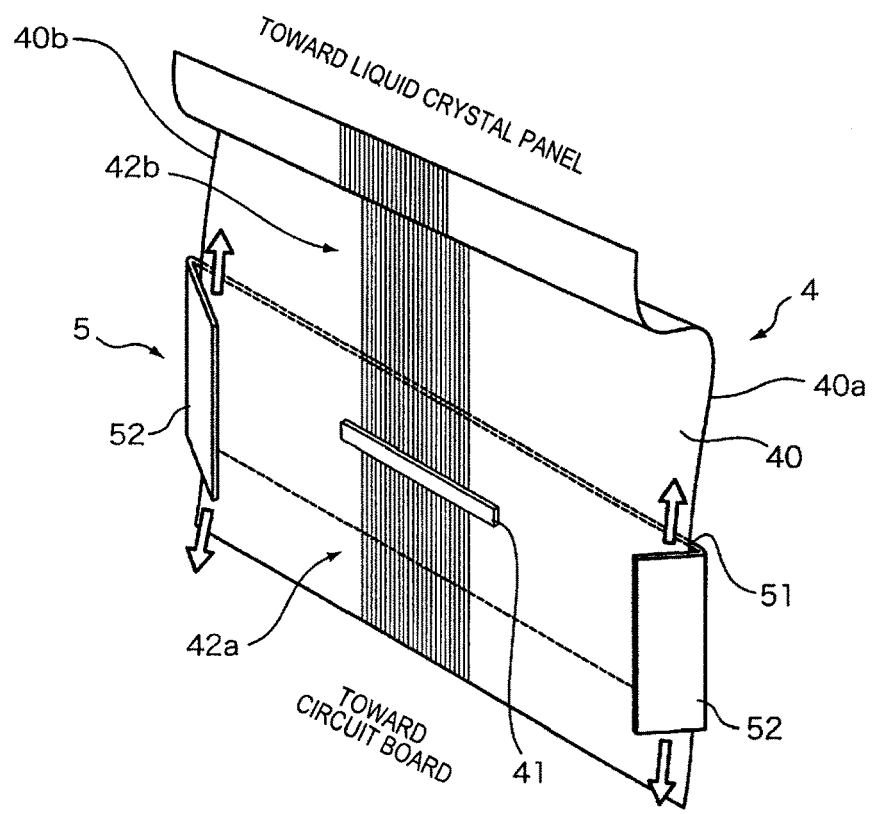
FIG. 6 is a schematic diagram illustrating a state where the cover according to Embodiment 1 is mounted onto a flexible printed circuit board.

FIG. 6 is a schematic diagram illustrating a state where the cover 5 according to Embodiment 1 is mounted onto the flexible printed circuit board 4. As shown in FIG. 6, the cover 5 is engaged with the flexible printed circuit board 4 so as to overlap a portion of the other surface (i.e., the second surface) of the flexible printed circuit board 4. This portion corresponds in location at least to the IC chip 41 and a periphery around the IC chip 41 on the first surface of the flexible printed circuit board 4. The cover 5 protects the IC chip 41 from external stresses, thus preventing destruction of the flexible printed circuit board 4 by reducing stress concentration on the connecting portions between the terminals and the wiring line 42a and 42b of the IC chip 41.

On the other hand, since the plate member 51 of the cover 5 has a slightly larger width than does the flexible printed circuit board 4, the cover 5 is slidable along two opposing edges 40a and 40b of the film base member 40 toward either the liquid crystal panel 1 or the circuit board 3. As a result, even if the film base member 40 suffers a bending deformation at a portion other than the surroundings of the IC chip 41 due to factors such as the shape of the liquid crystal panel 1, the positional relationship between the liquid crystal panel 1 and the circuit board 3, etc., the mounting position of the cover 5 may be deviated towards either the liquid crystal panel 1 or the circuit board 3 so as not to hinder bending deformation. Thus, without ruining the inherent flexibility of the flexible printed circuit board 4, the liquid crystal panel 1 and the circuit board 3 can be connected by the flexible printed circuit board 4.

As described above, Embodiment 1 allows each flexible printed circuit board 4 to be connected to the liquid crystal panel 1 and the circuit board 3, without ruining its inherent flexibility. Furthermore, Embodiment 1 also allows stress concentration around the IC chip 41 to be reduced, thereby preventing destruction of the flexible printed circuit board 4.

Embodiment 2

Embodiment 2 will describe an implementation where a pair of lift-up flaps are provided for a cover to be mounted onto each flexible printed circuit board 4. Note that, except for the cover to be mounted onto each flexible printed circuit board 4, the display apparatus in Embodiment 2 is structured similarly to that of Embodiment 1. Hence, in the following description, any constituent elements having similar counterparts in Embodiment 1 will be denoted by like reference numerals, and detailed description thereof will be omitted.

Figure 7:
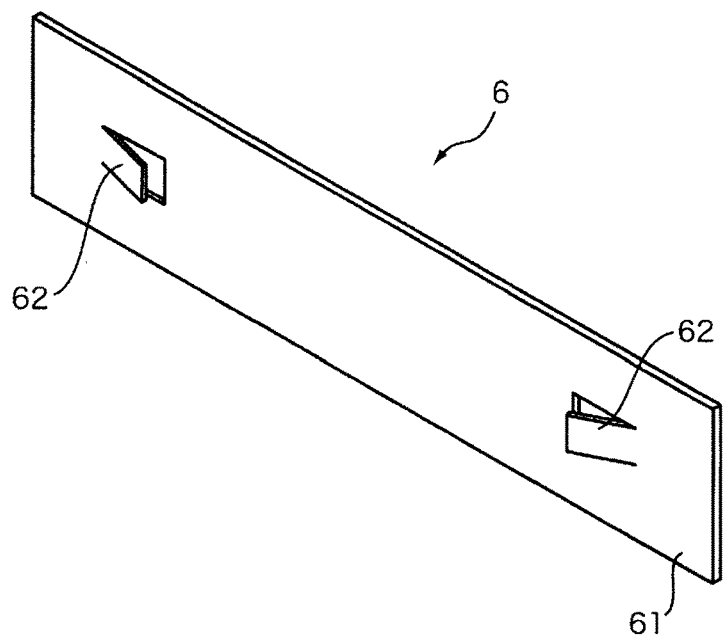
FIG. 7 is a schematic perspective view of a cover according to Embodiment 2.
Figure 8:
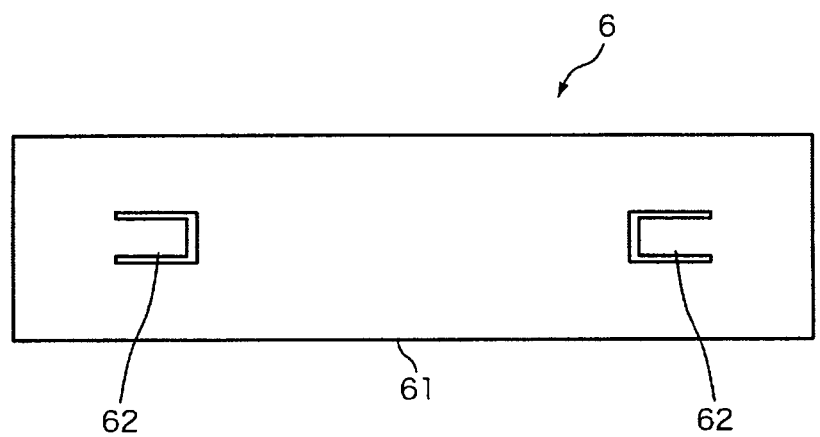
FIG. 8 is a front view of the cover according to Embodiment 2.
Figure 9:
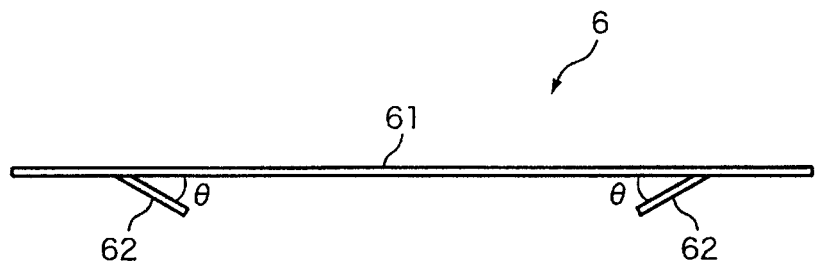
FIG. 9 is an upper plan view of the cover according to Embodiment 2.

FIG. 7 is a schematic perspective view of cover 6 according to Embodiment 2; FIG. 8 is a front view of the cover 6 according to Embodiment 2; and FIG. 9 is an upper plan view of the cover 6 according to Embodiment 2. The cover 6 according to Embodiment 2 includes: a rectangular-shaped plate member 61 having a width which is slightly larger than that of a flexible printed circuit board 4; and two lift-up flaps 62 that are aligned along the width direction of the plate member 61, the two lift-up flaps 62 being lifted up in directions such that they face each other. The two lift-up flaps 62 are positioned so that their interval is slightly larger than the width of the flexible printed circuit board 4. The plate member 61 and the two lift-up flaps 62 of the cover 6 are an integral piece formed out of a relatively light-weight, thin plate member made of e.g. a plastic.

The angle θ between the plate member 61 and each lift-up flap 62 of the cover 6 is an angle which is smaller than 90 degrees, or more preferably, an angle which is smaller than 45 degrees. Optionally, the lift-up flaps 62 may be structured as leaf springs each of which is urged toward the plate member 61 (i.e., in a direction of decreasing the angle θ). The cover 6 is mounted so as to engage with the flexible printed circuit board 4 by catching the flexible printed circuit board 4 in between the plate member 61 and the two lift-up flaps 62.

Figure 10:
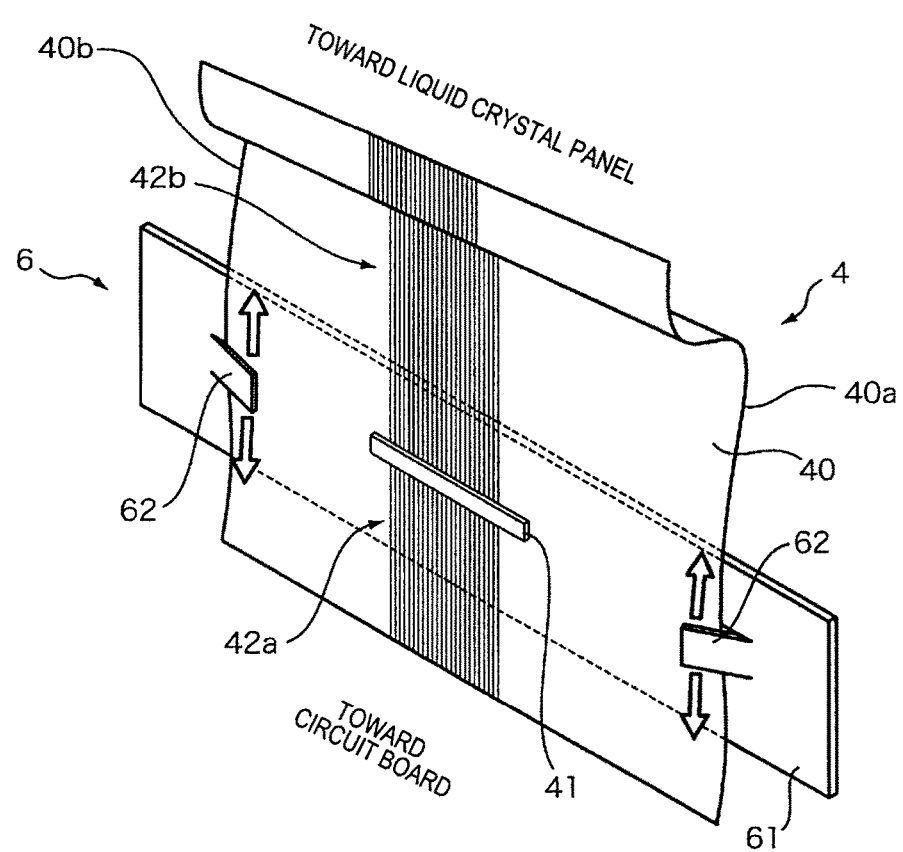
FIG. 10 is a schematic diagram illustrating a state where the cover according to Embodiment 2 is mounted onto a flexible printed circuit board.

FIG. 10 is a schematic diagram illustrating a state where the cover 6 according to Embodiment 2 is mounted onto the flexible printed circuit board 4. As shown in FIG. 10, the cover 6 is engaged with the flexible printed circuit board 4 so as to overlap a portion of the other surface (i.e., the second surface) of the flexible printed circuit, board 4. This portion corresponds in location at least to the IC chip 41 and a periphery around the IC chip 41 on the first surface of the flexible printed circuit board 4. The cover 6 protects the IC chip 41 from external stresses, thus preventing destruction of the flexible printed circuit board 4 by reducing stress concentration on the connecting portions between the terminals and the wiring lines 42a and 42b of the IC chip 41.

On the other hand, since the interval between the two lift-up flaps 62 is slightly larger than the width of the flexible printed circuit board 4, the cover 6 is slidable along two opposing edges 40a and 40b of the film base member 40 toward either the liquid crystal panel 1 or the circuit board 3. As a result, even if the film base member 40 suffers a bending deformation at a portion other than the surroundings of the IC chip 41 due to factors such as the shape of the liquid crystal panel 1, the positional relationship between the liquid crystal panel 1 and the circuit board 3, etc., the mounting position of the cover 6 may be deviated towards either the liquid crystal panel 1 or the circuit board 3 so as not to hinder bending deformation. Thus, without ruining the inherent flexibility of the flexible printed circuit board 4, the liquid crystal panel 1 and the circuit board 3 can be connected by the flexible printed circuit board 4.

As described above, Embodiment 2 allows each flexible printed circuit hoard 4 to be connected to the liquid crystal panel 1 and the circuit board 3, without ruining its inherent flexibility. Furthermore, Embodiment 2 also allows stress concentration around the IC chip 41 to be reduced, thereby preventing destruction of the flexible printed curt board 4.

Embodiment 3

Embodiment 3 will describe an implementation where a tubular body forms a cover to be mounted onto each flexible printed circuit board 4. Note that, except for the cover to be mounted onto each flexible printed circuit board 4, the display apparatus in Embodiment 3 is structured similarly to that of Embodiment 1. Hence, in the following description, any constituent elements having similar counterparts in Embodiment 1 will be denoted by like reference numerals, and detailed description thereof will be omitted.

Figure 11:
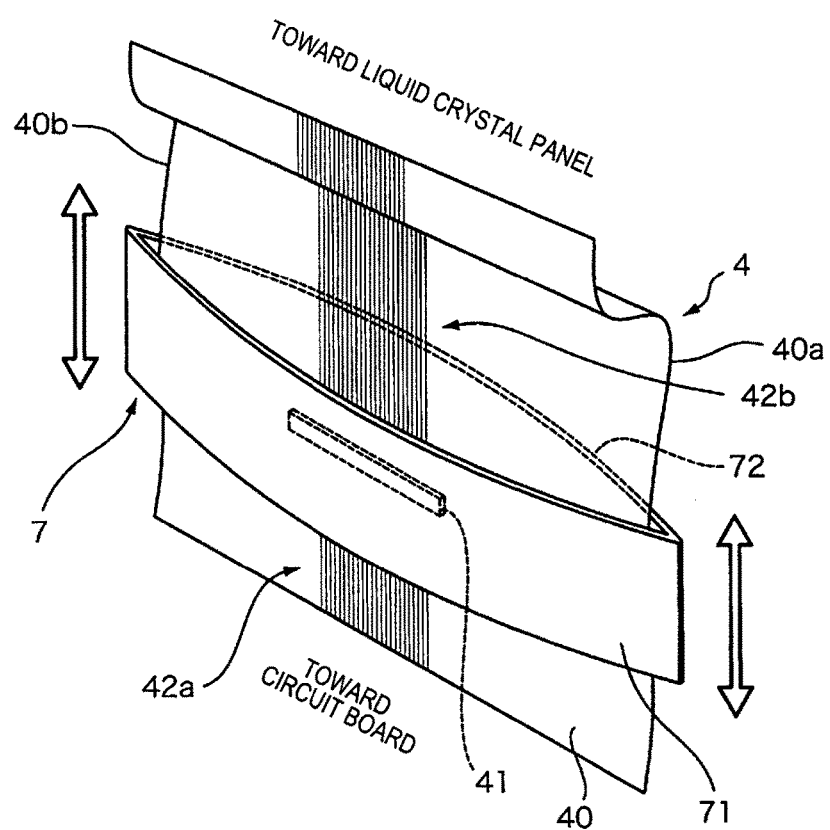
FIG. 11 is a schematic diagram illustrating a state where a cover according to Embodiment 3 is mounted onto a flexible printed circuit board.

FIG. 11 is a schematic diagram illustrating a state where a cover 7 according to Embodiment 3 is mounted onto a flexible printed circuit board 4. The cover 7 according to Embodiment 3 is a tubular body structured so that two curved plate members 71 and 72 are attached to each other at edges along the width direction thereof. The inner space between the two plate members 71 and 72 of the cover 7 is substantially elliptical as viewed from the top, the width of which along the major axis direction is slightly larger than that of the flexible printed circuit board 4.

The cover 7 is mounted so as to engage with the flexible printed circuit board 4 by sandwiching the flexible printed circuit board 4 between the two plate members 71 and 72. Thus, one plate member 71 of the cover 7 is disposed over the one surface (i.e., the first surface) of the flexible printed circuit board 4, while the other plate member 72 is disposed over the other surface the second surface) of the flexible printed circuit board 4.

The cover 7 is engaged with the flexible printed circuit board 4 so as to overlap the both first and second surfaces of the flexible printed circuit board 4 around the IC chip 41 and a periphery around the IC chip 41. The cover 7 protects the IC chip 41 from external stresses, thus preventing destruction of the flexible printed circuit board 4 by reducing stress concentration on the connecting portions between the terminals and the wiring lines 42a and 42b of the IC chip 41.

On the other hand, since the space formed between the two plate members 71 and 72 has a slightly larger width than does the flexible printed circuit board 4, the cover 7 is slidable along two opposing edges 40a and 40b of the film base member 40 toward either the liquid crystal panel 1 or the circuit board 3. As a result, even if the film base member 40 suffers a bending deformation at a portion other than the surroundings of the IC clip 41 due to factors such as the shape of the liquid crystal panel 1, the positional relationship between the liquid crystal panel 1 and the circuit board 3, etc., the mounting position of the cover 7 may be deviated towards either the liquid crystal panel 1 or the circuit board 3 so as not to hinder bending deformation. Thus, without ruining the inherent flexibility of the flexible printed circuit board 4, the liquid crystal panel 1 and the circuit board 3 can be connected by the flexible printed circuit board 4.

As described above, Embodiment 3 allows each flexible printed circuit board 4 to be connected to the liquid crystal panel 1 and the circuit board 3, without ruining its inherent flexibility. Furthermore, Embodiment 3 also allows stress concentration around the IC chip 41 to be reduced, thereby preventing destruction of the flexible printed circuit board 4.

The embodiments of this disclosure should not be considered restrictive but illustrative in all respects. The scope of the present invention is to be indicated, not in the sense as described above, but by a set of claims that will follow, and is intended to include any variations that are within the sense and scope equivalent to the set of claims. Moreover, any technological features described in the embodiments may be combined with one another in any way.

For example, in the embodiments of the present invention, structures of a liquid crystal display apparatus having a plate-like display panel have been discussed. However, it will be appreciated that the present invention is also applicable to a liquid crystal display apparatus having a curved display panel.

Moreover, in the embodiments of the present invention, example applications to a liquid crystal display apparatus have been discussed. However, it will be appreciated that the present invention is also applicable to other types of display apparatuses such as organic EL displays, plasma displays, etc.

What is claimed is:
1. A display apparatus, comprising:
   a display panel;
   a circuit board which outputs an image signal associated with an image to be displayed on the display panel;
   a flexible printed circuit board which connects the display panel and the circuit board, the flexible printed circuit board having a first surface and a second surface opposite to the first surface, wiring lines and a driving circuit being provided on the first surface, the wiring lines providing electrical connection between the display panel and the circuit board, and the driving circuit driving the display panel based on the image signal which is output from the circuit board; and
   a cover overlapping a portion of the second surface of the flexible printed circuit board, the portion corresponding in location at least to the driving circuit and a periphery around the driving circuit on the first surface, the cover being engaged with the flexible printed circuit board so as to be capable of sliding along two opposing edges of the flexible printed circuit board that are connected to neither the display panel nor the circuit board,
   wherein the cover includes:
   a plate member disposed over the second surface of the flexible printed circuit board, the plate member having a width which is larger than a distance separating the two opposing edges of the flexible printed circuit board; and two fold-back flaps continuing from the plate member, the two fold-back flaps being respectively folded back from two opposing edges along the width direction of the plate member toward the first surface of the flexible printed circuit board.

2. A display apparatus, comprising:

a display panel;

a circuit board which outputs an image signal associated with an image to be displayed on the display panel;

a flexible printed circuit board which connects the display panel and the circuit board, the flexible printed circuit board having a first surface and a second surface opposite to the first surface, wiring lines and a driving circuit being provided on the first surface, the wiring lines providing electrical connection between the display panel and the circuit board, and the driving circuit driving the display panel based on the image signal which is output from the circuit board; and a cover overlapping a portion of the second surface of the flexible printed circuit board, the portion corresponding in location at least to the driving circuit and a periphery around the driving circuit on the first surface, the cover being engaged with the flexible printed circuit board so as to be capable of sliding along two opposing edges of the flexible printed circuit board that are connected to neither the display panel nor the circuit board, wherein the cover includes:

a plate member disposed over the second surface of the flexible printed circuit board, the plate member having a width which is larger than a distance separating the two opposing edges of the flexible printed circuit board; and two lift-up flaps disposed on the first surface of the flexible printed circuit board so as to respectively catch the two opposing edges of the flexible printed circuit board in between the plate member and themselves.

3. The display apparatus of claim 2, wherein the plate member and the two lift-up flaps comprise an integral piece.

4. The display apparatus of claim 1, wherein the cover is a tubular body overlapping both the first surface and the second surface of the flexible printed circuit board.

5. The display apparatus of claim 2, wherein the cover is a tubular body overlapping both the first surface and the second surface of the flexible printed circuit board.

* * * * *